(12) United States Patent
Joe et al.

(10) Patent No.: US 12,519,096 B2
(45) Date of Patent: Jan. 6, 2026

(54) METHOD FOR MANUFACTURING CATHODE FOR LITHIUM SECONDARY BATTERY, AND CATHODE

(71) Applicant: LG Energy Solution, Ltd., Seoul (KR)

(72) Inventors: Youn Cheol Joe, Daejeon (KR); O Jong Kwon, Daejeon (KR); Ki Woong Kim, Daejeon (KR); Min Hyun Kim, Daejeon (KR); Jeong Geun Jo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 62 days.

(21) Appl. No.: 18/288,464

(22) PCT Filed: Dec. 23, 2022

(86) PCT No.: PCT/KR2022/021215
§ 371 (c)(1),
(2) Date: Oct. 26, 2023

(87) PCT Pub. No.: WO2023/121401
PCT Pub. Date: Jun. 29, 2023

(65) Prior Publication Data
US 2024/0222593 A1   Jul. 4, 2024

(30) Foreign Application Priority Data
Dec. 24, 2021  (KR) .................. 10-2021-0187036

(51) Int. Cl.
*H01M 4/04*     (2006.01)
*H01M 4/1391*   (2010.01)
*H01M 4/58*     (2010.01)
*H01M 4/02*     (2006.01)

(52) U.S. Cl.
CPC ....... *H01M 4/0404* (2013.01); *H01M 4/0435* (2013.01); *H01M 4/1391* (2013.01); *H01M 4/5825* (2013.01); *H01M 2004/028* (2013.01)

(58) Field of Classification Search
None
See application file for complete search history.

(56) References Cited

U.S. PATENT DOCUMENTS

| | | |
|---|---|---|
| 2005/0236732 A1 | 10/2005 | Brosch et al. |
| 2009/0142668 A1 | 6/2009 | Ishii |
| 2010/0233540 A1 | 9/2010 | Choy et al. |
| 2016/0049637 A1 | 2/2016 | Sohn et al. |
| 2016/0181651 A1 | 6/2016 | Tanihara et al. |
| 2016/0204423 A1 | 7/2016 | Jeong et al. |
| 2017/0256781 A1* | 9/2017 | Suzuki ............... H01M 4/139 |
| 2018/0159126 A1 | 6/2018 | Choi et al. |
| 2019/0013545 A1 | 1/2019 | Kim et al. |
| 2019/0229328 A1* | 7/2019 | Cho .................. H01M 4/13 |
| 2021/0013487 A1 | 1/2021 | Koo et al. |
| 2022/0285662 A1* | 9/2022 | Song ............... H01M 4/0404 |

FOREIGN PATENT DOCUMENTS

| | | |
|---|---|---|
| CN | 109560249 A | 4/2019 |
| CN | 110544769 A | 12/2019 |
| JP | H1064521 A | 3/1998 |
| JP | 2000133316 A | 5/2000 |
| JP | 2016119207 A | 6/2016 |
| KR | 20110107718 A | 10/2011 |
| KR | 20160020648 A | 2/2016 |
| KR | 20160040156 A | 4/2016 |
| KR | 101658510 B1 | 9/2016 |
| KR | 20170040766 A | 4/2017 |
| KR | 20170111740 A | 10/2017 |
| KR | 20180058197 A | 5/2018 |
| KR | 20190108429 A | 9/2019 |
| KR | 102100879 B1 | 4/2020 |
| KR | 102238555 B1 | 4/2021 |

OTHER PUBLICATIONS

Extended European Search Report including Written Opinion for Application No. 22912034.0 dated Feb. 5, 25, pp. 1-14.
International Search Report for PCT/KR2022/021215 mailed Mar. 29, 23. 6 pages.

* cited by examiner

*Primary Examiner* — Austin Murata
(74) *Attorney, Agent, or Firm* — Lerner David LLP

(57) ABSTRACT

A method for manufacturing a positive electrode for a lithium secondary battery includes: (S1) forming a positive electrode active material layer by applying a positive electrode slurry composition comprising lithium iron phosphate and a binder onto a current collector and drying it; (S2) rolling a positive electrode active material layer N times (N is an integer greater than or equal to 2). In the rolling step during the first rolling, the rate of change in thickness of a positive electrode active material layer according to Equation 1 below is 5% to 15%, and during subsequent rolling, the rate of change in thickness of a positive electrode active material layer according to Equation 1 below is 3.5% or less.

13 Claims, 4 Drawing Sheets

[FIG. 1]
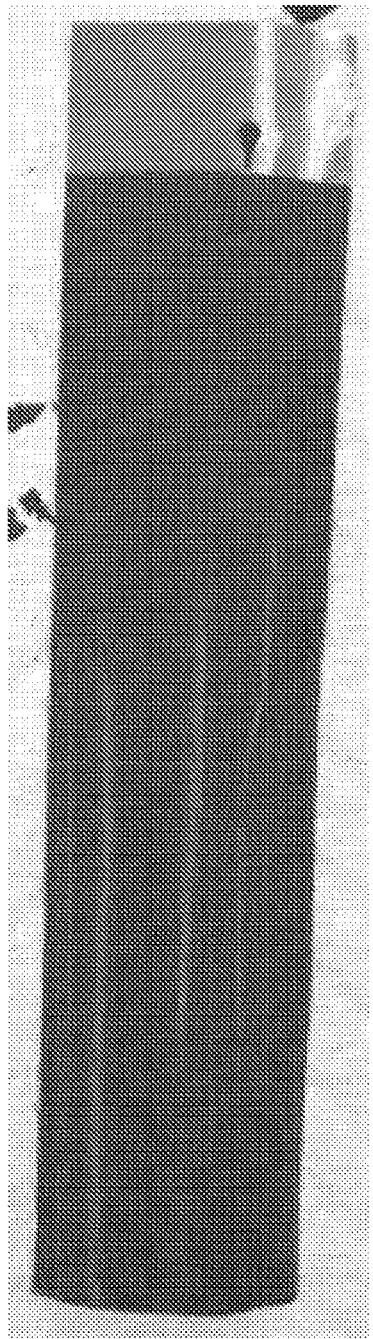

[FIG. 2]

[FIG. 3]

[FIG. 4]
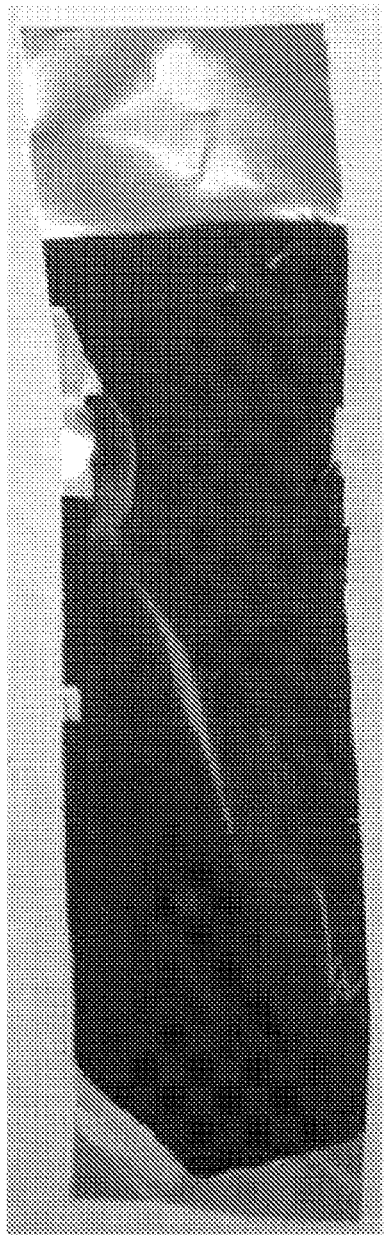

US 12,519,096 B2

METHOD FOR MANUFACTURING CATHODE FOR LITHIUM SECONDARY BATTERY, AND CATHODE

CROSS-REFERENCE TO RELATED APPLICATIONS

This application is a national phase entry under 35 U.S.C. § 371 of International Application No. PCT/KR2022/021215, filed on Dec. 23, 2022, which claims priority from Korean Patent Application No. 10-2021-0187036, filed on Dec. 24, 2021, all of which are incorporated herein by reference.

TECHNICAL FIELD

The present disclosure relates to a method for manufacturing a positive electrode for a lithium secondary battery and a positive electrode, and more specifically, a method for manufacturing a positive electrode for a lithium secondary battery through a plurality of times of rolling and a positive electrode manufactured by the same method.

BACKGROUND TECHNOLOGY OF THE INVENTION

As demands and technology developments for electric vehicles and energy storage system (ESS) increase, the demand for batteries as an energy source is rapidly increasing, and accordingly, various studies have been conducted on batteries that can meet various needs. In particular, research on lithium secondary batteries having a high energy density, an excellent lifespan, and excellent cycle characteristics as a power source for such devices has been actively conducted.

As a positive electrode active material of a lithium secondary battery, lithium cobalt oxide (LCO), lithium nickel cobalt manganese oxide (LNCMO), lithium iron phosphate (LFP), and the like are used.

Lithium iron phosphate is inexpensive because it contains iron, which is an abundant resource and an inexpensive material. In addition, since the toxicity of lithium iron phosphate is low, environmental pollution can be reduced when lithium iron phosphate is used. Moreover, since lithium iron phosphate has an olivine structure, the active material structure can be stably maintained at a high temperature compared to a lithium transition metal oxide with a layered structure. Accordingly, there is an advantage in that the battery has an improved high-temperature stability and high-temperature lifespan characteristics.

However, since lithium iron phosphate has a non-spherical shape, it is difficult to manufacture a high-density positive electrode due to a low tap density of lithium iron phosphate. To solve this problem, a high rolling rate is required in the process of rolling a positive electrode slurry composition on a positive electrode current collector. However, when the positive electrode slurry composition is rolled at a high rolling rate, there is a problem in that a positive electrode active material layer is separated from a positive electrode current collector due to a difference in mechanical properties (e.g., elongation, Poisson's ratio, etc.) between the positive electrode current collector and the positive electrode active material layer.

Accordingly, conventionally, in order to obtain a high-density positive electrode while preventing separation of the positive electrode active material layer, an increased content of the binder in the positive electrode slurry composition has been used. However, when the content of the binder in the positive electrode slurry composition is increased, the resistance of the lithium secondary battery increases, and the content of the positive electrode active material is relatively reduced, so there is a problem in that the battery capacity of the positive electrode is reduced.

Accordingly, in manufacturing a positive electrode including lithium iron phosphate, there is a demand for developing a technology for manufacturing a high-density positive electrode while preventing separation of the positive electrode active material layer.

DESCRIPTION OF THE INVENTION

Technical Problem

In terms of a method for manufacturing a positive electrode for a lithium secondary battery including lithium iron phosphate, an aspect of the present invention is directed to provide a method for manufacturing a high-density positive electrode while preventing separation of a positive electrode active material layer from a positive electrode current collector.

Technical Solution

According to an exemplary embodiment of the present invention, a method for manufacturing a positive electrode for a lithium secondary battery, including: (S1) forming a positive electrode active material layer by applying a positive electrode slurry composition including lithium iron phosphate and a binder onto a current collector and drying it; (S2) rolling a positive electrode active material layer N times (N is an integer greater than or equal to 2), wherein in the rolling step, during the first rolling, the rate of change in thickness of a positive electrode active material layer according to Equation 1 below is 5% to 15%, and during rolling after the first rolling, the rate of change in thickness of a positive electrode active material layer according to Equation 1 below is 3.5% or less, and a positive electrode manufactured according to the manufacturing method is provided.

$$\text{Rate of change in thickness (\%)} = \{\text{thickness of } (K-1) \text{ times rolled positive electrode active material layer} - \text{thickness of } K \text{ times rolled positive electrode active material layer}\} \times 100/\text{thickness of positive electrode active material layer before rolling step}. \quad [\text{Equation 1}]$$

In Equation 1, K is an integer greater than or equal to 1 and smaller than or equal to N.

In an exemplary embodiment of the present invention, the rolling step may be performed by a multi-stage rolling of 3 times to 6 times.

In an exemplary embodiment of the present invention, after the rolling step, the porosity of the positive electrode active material layer may be 28% to 36%.

In an exemplary embodiment of the present invention, after the rolling step, the thickness of the positive electrode active material layer may be 85 μm to 95 μm.

In an exemplary embodiment of the present invention, after the rolling step, the rolling ratio of the positive electrode active material layer may be 20% to 26%.

In an exemplary embodiment of the present invention, the porosity of the dried positive electrode slurry composition may be 55% or less.

In an exemplary embodiment of the present invention, after the first rolling step, the rolling ratio of the positive electrode active material layer may be 10% or more.

In an exemplary embodiment of the present invention, the rolling step may be performed by a roll press method.

In an exemplary embodiment of the present invention, the lithium iron phosphate may be a compound represented by Formula 1 below.

[Formula 1]

(In Formula 1, M includes one or two or more elements selected from the group consisting of Al, Mg, Ni, Co, Mn, Ti, Ga, Cu, V, Nb, Zr, Ce, In, Zn, and Y, X includes one or two or more elements selected from the group consisting of F, S, and N, and a, b, and x are $-0.5 \leq a \leq 0.5$, $0 \leq b \leq 0.1$, $0 \leq x \leq 0.5$, respectively)

In an exemplary embodiment of the present invention, the lithium iron phosphate may be $LiFePO_4$ with an olivine crystal structure.

In an exemplary embodiment of the present invention, the lithium iron phosphate may be included in an amount of 94.90 wt % to 97.96 wt % in the solid content of the positive electrode slurry composition.

In an exemplary embodiment of the present invention, the binder may be included in an amount of 0.5 wt % to 3.5 wt % in the solid content of the positive electrode slurry composition.

Advantageous Effects

According to an aspect of the present invention, when rolling a positive electrode slurry containing lithium iron phosphate for a plurality of times, during the rolling after the first rolling, separation of the positive electrode active material layer from the positive electrode current collector is effectively suppressed by rolling so that the rate of change in thickness of the positive electrode active material layer is 3.5% or less. As a result, it is possible to manufacture a high-density positive electrode with a significantly reduced electrode defect rate.

In addition, by the above method, even if the content of the binder in the positive electrode slurry composition is at a low level, a high-density positive electrode with improved adhesive force between the positive electrode current collector and the positive electrode active material layer (hereinafter referred to as positive electrode adhesive force) can be manufactured. Moreover, as the content of the binder in the positive electrode active material layer is low, the resistance of the lithium secondary battery may be reduced, and the content of the positive electrode active material in the positive electrode active material layer may be relatively increased, thereby improving the battery capacity of the positive electrode.

BRIEF DESCRIPTION OF THE DRAWINGS

FIG. 1 is a photograph of a positive electrode prepared in Example 1.

FIG. 2 is a photograph of a positive electrode prepared in Comparative Example 1.

FIG. 3 is a photograph of a positive electrode prepared in Comparative Example 2.

FIG. 4 is a photograph of a positive electrode prepared in Comparative Example 3.

DETAILED DESCRIPTION

The advantages and the features of some embodiments of the present invention, and the methods of achieving them will become clear with reference to the detailed description of the following embodiments in conjunction with the accompanying drawings. However, the present invention is not limited to the embodiments disclosed below and may be implemented in various different forms. The present embodiments only make the disclosure of the present invention complete, and are provided to fully inform the scope of some embodiments of the invention to those skilled in the art to which the present invention belongs, and the present invention is only defined by the scope of the claims. Throughout the specification, like reference numerals refer to like elements.

Unless defined otherwise, all terms (including technical and scientific terms) used in this specification may be used in a meaning commonly understood by those skilled in the art to which the present invention belongs. In addition, the terms defined in commonly used dictionaries are not interpreted ideally or excessively unless explicitly and specifically defined.

The terms used in this specification are for describing the embodiments and are not intended to limit the present invention. In this specification, singular forms also include plural forms unless particularly stated otherwise in the phrase. "Comprise" and/or "comprising" used herein does not exclude the presence or addition of one or more other elements besides the stated elements.

In the present specification, when a part includes a certain element, unless stated otherwise, this means that it may further include other elements without excluding other components.

In this specification, the description of "A and/or B" means A, or B, or A and B.

In this specification, "%" means wt % unless explicitly indicated otherwise.

In this specification, $D_{50}$ means a particle size corresponding to 50% of the cumulative volume in the particle size distribution curve of particles. For example, the $D_{50}$ can be measured by using a laser diffraction method. The laser diffraction method is generally capable of measuring particle diameters from a submicron scale to several millimeters, and can obtain results with high reproducibility and high resolution.

In the present specification, multi-stage rolling, as opposed to single rolling, means rolling a plurality of times, and first rolling refers to rolling that is first performed on the positive electrode active material layer formed by drying the positive electrode slurry composition.

In this specification, the rate of change in thickness (%) can be calculated as in Equation 1 below.

Rate of change in thickness (%) = [Equation 1]

$$\{\text{thickness of } (K-1) \text{ times rolled positive electrode active material layer} - \text{thickness of } K \text{ times rolled positive electrode active material layer}\} \times 100/\text{thickness of positive electrode active material layer before rolling step}$$

In Equation 1, K is an integer greater than or equal to 1 and smaller than or equal to N, and N is an integer greater than or equal to 2.

In this specification, the rolling rate (%) can be calculated as in Equation 2 below.

Rolling rate (%) = [Equation 2]

$$\{(\text{thickness of the positive electrode active material layer before rolling} - \text{thickness of the positive electrode active material layer after rolling } K \text{ times})/\text{thickness of the positive electrode active material layer before rolling}\} \times 100$$

In the present specification, the porosity can be calculated as in Equation 3 below.

Porosity = [Equation 3]

$$\{1 - (\text{density of the positive electrode active material layer after rolling } K \text{ times/density of an ideal positive electrode active material layer})\} \times 100$$

Here, "density of an ideal positive electrode active material layer" is the density of a virtual positive electrode active material layer filled with a positive electrode active material, a conductive material, a binder, etc. without an empty space in a positive electrode in which lithium iron phosphate as the positive electrode active material is 95% to 100%, and it was 3.39 g/cc in the Example of the present invention. In addition, the porosity may vary depending on the mixing ratio between the positive electrode active material, the conductive material, the binder, etc., but is known to have a value within the range of 3.3 g/cc to 3.5 g/cc.

In this specification, after the rolling step means after completing all the rolling processes composed of a plurality of times.

Hereinafter, some embodiments of the present invention will be described in more detail.

A Method for Manufacturing a Positive Electrode for a Lithium Secondary Battery

A method for manufacturing a positive electrode for a lithium secondary battery of some embodiments of the present invention includes: (S1) forming a positive electrode active material layer by applying a positive electrode slurry composition including lithium iron phosphate and a binder onto a current collector and drying it; (S2) rolling a positive electrode active material layer N times (N is an integer greater than or equal to 2).

In this case, during the first rolling, the rate of change in thickness of the positive electrode active material layer according to Equation 1 below is in the range of 5% to 15%, and during rolling after the first rolling, the rate of change in thickness of the positive electrode active material layer according to Equation 1 below is 3.5% or less.

Rate of change in thickness (%) = [Equation 1]

$$\{\text{thickness of } (K-1) \text{ times rolled positive electrode active material layer} - \text{thickness of } K \text{ times rolled positive electrode active material layer}\} \times 100/\text{thickness of positive electrode active material layer before rolling step}$$

In Equation 1, K is an integer greater than or equal to 1 and smaller than or equal to N.

Since lithium iron phosphate has a non-spherical shape and thus has a low tap density, a high rolling rate is required during the rolling process of the positive electrode slurry in order to obtain a high-density positive electrode. However, when the positive electrode slurry is rolled at a high rolling ratio, there is a problem in that the positive electrode active material layer is separated due to a difference in mechanical properties between the positive electrode current collector and the positive electrode active material layer.

As a result of repeated research to solve this problem, the present inventors have found that when a positive electrode slurry containing lithium iron phosphate is rolled a plurality of times, by rolling so that the rate of change in thickness after rolling two times is 3.5% or less, separation of the positive electrode active material layer from the positive electrode current collector could be prevented, thereby completing an embodiment of the present invention. As in some embodiments of the present invention, when rolling is performed so that the rate of change in thickness of rolling twice is 3.5% or less, a high-density positive electrode having excellent positive electrode adhesive force can be manufactured even when the content of the binder in the positive electrode slurry composition is relatively reduced. This will be explained in detail below.

(1) Applying and Drying Positive Electrode Slurry Composition

The method for manufacturing a positive electrode for a lithium secondary battery according to some embodiments of the present invention may include applying a positive electrode slurry composition on a positive electrode current collector and drying it.

The positive electrode slurry composition may be prepared by mixing or dispersing a positive electrode active material and a binder in a solvent. In addition, besides the positive electrode active material and the binder, the positive electrode slurry composition may be prepared by additionally mixing or dispersing a conductive material and a dispersant in a solvent, if necessary.

The positive electrode current collector may be anything that has conductivity without causing chemical change in the battery, and is not particularly limited. For example, as the current collector, stainless steel, aluminum, nickel, titanium, baked carbon, or aluminum or stainless steel surface-treated with carbon, nickel, titanium, silver, and the like may be used.

The positive electrode current collector may have a thickness of 3 μm to 500 μm, and the adhesive force to the positive electrode active material layer may be increased by forming micro/nano scaled unevenness on the surface of the positive electrode current collector. For example, it may be used in various forms such as films, sheets, foils, nets, porous materials, foams, non-woven fabrics, and the like.

The positive electrode active material according to some embodiments of the present invention may include lithium iron phosphate. Since lithium iron phosphate has an olivine structure, the active material structure is stably maintained at high temperatures compared to lithium transition metal oxide having a layered structure. As a result, when lithium iron phosphate is used as a positive electrode active material, high-temperature stability and high-temperature lifespan characteristics of the positive electrode are significantly improved, thereby reducing the risk of ignition in the lithium secondary battery including the positive electrode.

The lithium iron phosphate may be a compound represented by Formula 1 below.

[Formula 1]

(In Formula 1, M includes one or two or more elements selected from the group consisting of Al, Mg, Ni, Co, Mn, Ti, Ga, Cu, V, Nb, Zr, Ce, In, Zn, and Y, X includes one or two or more elements selected from the group consisting of F, S, and N, and a, b, and x are $-0.5 \leq a \leq 0.5$, $0 \leq b \leq 0.1$, $0 \leq x \leq 0.5$, respectively)

For example, the lithium iron phosphate may be $LiFePO_4$ having an olivine crystal structure.

In addition, the lithium iron phosphate may have a monolith structure composed of primary particles. In some embodiments of the present invention, the 'monolith structure' means a structure in which the particles exist as independent phases in which the particles are not agglomerated with each other in a morphology phase. In terms of a particle structure in contrast to this monolith structure, a structure in which small-sized particles ('primary particles') are physically and/or chemically aggregated to form relatively large-sized particles ('secondary particles') can be mentioned.

When lithium iron phosphate has a monolith structure composed of primary particles, the possibility of breakage of the lithium iron phosphate particles during the rolling process is small compared to the case of being composed of secondary particles, which is preferable in that the capacity reduction due to separation of the broken particles is small. In addition, when lithium iron phosphate is a primary particle having a monolith structure, migration of the binder can be mitigated during the drying process of the positive electrode slurry, which may be preferable in terms of interfacial adhesive force between the positive electrode current collector and the positive electrode active material layer.

The lithium iron phosphate may include a carbon coating layer on the surface. When a carbon coating layer is formed on the surface of lithium iron phosphate, electrical conductivity may be improved, thereby improving resistance characteristics of the positive electrode.

The carbon coating layer may be formed by using at least one raw material selected from the group consisting of glucose, sucrose, lactose, starch, oligosaccharide, polyoligosaccharide, fructose, cellulose, polymer of furfuryl alcohol, block copolymer of ethylene and ethylene oxide, vinyl resin, cellulose resin, phenolic resin, pitch-based resin, and tar-based resin. Specifically, the carbon coating layer may be formed through a process of heat-treating after mixing the raw materials with the lithium iron phosphate.

The average particle diameter $D_{50}$ of the lithium iron phosphate may be 0.5 μm to 20.0 μm, preferably 0.5 μm to 10.0 μm, more preferably 0.6 μm to 3 μm, and even more preferably 0.6 μm to 2.5 μm. When the average particle diameter $D_{50}$ of the positive electrode active material satisfies the above range, lithium mobility in lithium iron phosphate is improved, and thus the charging/discharging characteristics of the battery may be improved.

The BET specific surface area of lithium iron phosphate may be 5 $m^2/g$ to 20 $m^2/g$, specifically 7 $m^2/g$ to 18 $m^2/g$, and more specifically 9 $m^2/g$ to 16 $m^2/g$. This range corresponds to a lower value compared to a conventional lithium iron phosphate. When the above range is satisfied, aggregation of the lithium iron phosphate may be effectively inhibited even in a positive electrode slurry composition having a relatively low dispersant content.

The lithium iron phosphate may be included in the solid content of the positive electrode slurry composition in an amount of 94.90 wt % to 97.96 wt %, specifically 95.40 wt % to 97.68 wt %, and more specifically 95.96 wt % to 97.55 wt %. When the content of lithium iron phosphate satisfies the above range, the battery capacity of the positive electrode may be improved by retaining sufficient positive electrode energy density.

A binder plays a role of assisting in the bond between the positive electrode active material and the conductive material, and the like and the bonding to the current collector. Specific examples include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene polymer (EPDM), sulfonated-EPDM, styrene-butadiene rubber, fluoro-rubber, or various copolymers thereof, and the like, and one or a mixture of two or more of these may be used.

In the process of preparing the positive electrode slurry, the mixture including the positive electrode active material, the binder, the conductive material, the dispersant, and the solvent is stirred, and shear force is applied to the positive electrode slurry during the stirring process. Here, when the carbon coating layer formed on the surface of the lithium iron phosphate is coupled with the functional group of the binder, gelation of the positive electrode slurry composition may occur during the manufacturing process of the positive electrode slurry. This gelation may intensify as the size of the lithium iron phosphate particles becomes smaller.

In order to prevent the gelation of the positive electrode slurry, the polyvinylidene fluoride preferably satisfies the following Equation 4.

$$0 \leq \{(2A+B)/(C+D)\} \times 100 < 0.2 \qquad \text{[Equation 4]}$$

(The A, B, C, and D are the integrated areas of each peak appearing at 11.5 ppm to 12.8 ppm, 3.9 ppm to 4.2 ppm, 2.6 ppm to 3.2 ppm, and 2.1 ppm to 2.35 ppm when $^1$H-NMR measurement is performed on the polyvinylidene fluoride, respectively)

In this case, the 11.5 ppm to 12.8 ppm section represents the $^1$H-NMR peak region of the COOH functional group included in polyvinylidene fluoride (PVdF), and the 3.9 ppm to 4.2 ppm section represents the $^1$H-NMR peak region of the $OCH_2$ functional group included in polyvinylidene fluoride (PVdF). In addition, the 2.6 ppm to 3.2 ppm section represents the $^1$H-NMR peak region of the polyvinylidene fluoride (PVdF) monomer coupled head-to-head, and the 2.1 ppm to 2.35 ppm section represents the $^1$H-NMR peak region of polyvinylidene fluoride (PVdF) monomers coupled head-to-tail.

Meanwhile, the fact that polyvinylidene fluoride (PVdF) satisfies Equation 4 means that a relatively small number of polar functional groups such as COOH and OCH$_2$ are contained in polyvinylidene fluoride.

When the polyvinylidene fluoride contained in the binder in the positive electrode slurry does not satisfy Equation 4, a number of hydrogen bonds are formed between the functional groups (e.g., COOH, OCH$_2$) in the binder and the hydrogen on the carbon coating layer, and as a result, gelation of the positive electrode slurry composition may occur.

In contrast, when the polyvinylidene fluoride contained in the binder in the positive electrode slurry satisfies Equation 4, the number of hydrogen bonds between the functional groups and hydrogen on the carbon coating layer is reduced because there are less functional groups in the binder. Accordingly, gelation of the positive electrode slurry is prevented, coating processability of the positive electrode slurry is improved, and the thickness and/or surface of the coated positive electrode active material layer can be formed uniformly.

In particular, the effect of preventing gelation of the positive electrode slurry may be more conspicuous when lithium iron phosphate is used as the positive electrode active material. Specifically, since lithium iron phosphate has a smaller average particle diameter and a larger specific surface area than conventional positive electrode active materials such as lithium nickel cobalt manganese oxide, the number of sites where the hydrogen bonds can occur increases, making the gelation more likely to occur. For this reason, when the polyvinylidene fluoride included in the binder in the positive electrode slurry satisfies Equation 4, the possibility of the gelation occurring in the positive electrode slurry using lithium iron phosphate as a positive electrode active material can be greatly reduced.

In addition, the polyvinylidene fluoride-based polymer binder has a stronger tendency to couple with lithium iron phosphate than to the positive electrode current collector. And since the coupling force of the polyvinylidene fluoride that satisfies Equation 4 with lithium iron phosphate is lower than that of polyvinylidene fluoride that does not satisfy Equation 4, the interfacial adhesive force between the positive electrode active material layer and the current collector may be improved.

Preferably, the binder may be a homopolymer of polyvinylidene fluoride (PVDF). For example, when the binder is a polyvinylidene fluoride homopolymer, since a polar functional group is not present in the binder, a hydrogen bond is not formed between the carbon coating layer and the binder, and thus gelation of the positive electrode slurry composition can be prevented.

The weight average molecular weight of the binder may be 20,000 g/mol to 1,200,000 g/mol, specifically 100,000 g/mol to 1,000,000 g/mol, and more specifically 400,000 g/mol to 980,000 g/mol. When the weight average molecular weight of the binder satisfies the above range, the positive electrode slurry composition may have a viscosity suitable for the coating process, and as a result, it is desirable in that the uniformity of the positive electrode active material layer formed of the composition is retained and the positive electrode adhesive force is improved.

According to an exemplary embodiment of the present invention, the binder may be included in an amount of 0.5 wt % to 3.5 wt %, specifically 0.5 wt % to 3.0 wt %, and more specifically 0.5 wt % to 1.5 wt % in the solid content of the positive electrode slurry composition.

According to some embodiments of the present invention, when the positive electrode slurry containing lithium iron phosphate is rolled a plurality of times, even if the content of the binder in the positive electrode slurry composition is at a low level, a high-density positive electrode with excellent positive electrode adhesive force can be manufactured by rolling so that the rate of change in thickness in the second rolling process is 3.5% or less. In addition, as the content of the binder in the positive electrode active material layer is low, resistance of the lithium secondary battery may be reduced, and the content of the positive electrode active material in the positive electrode active material layer may be relatively increased, thereby improving the battery capacity of the positive electrode.

A conductive material is not particularly limited as long as it has conductivity without causing chemical change in the battery, and examples thereof include graphite; carbon black such as carbon black, acetylene black, ketjen black, channel black, furnace black, lamp black, summer black, and the like; conductive fibers such as carbon fiber, metal fiber, and the like; metal powders such as carbon fluoride, aluminum, and nickel powder, and the like; conductive whiskeys such as zinc oxide, potassium titanate, and the like; conductive metal oxides such as titanium oxide, and the like; conductive materials such as a polyphenylene derivative, and the like. Among the above, carbon nanotubes, carbon nanofibers, and carbon black are preferable as the conductive material of some embodiments of the present invention, and carbon nanotubes are most preferable. Since the conductive network of carbon nanotubes is capable of mitigating migration of the binder during the drying process of the positive electrode slurry composition, it is most preferable as the conductive material included in the positive electrode of some embodiments of the present invention.

The carbon nanotube has a sp2 coupling structure, and has a graphite sheet having a cylindrical shape with a nano-sized diameter, and exhibits characteristics of a conductor or a semiconductor depending on the angle and structure at which the graphite sheet is rolled. Carbon nanotubes can be classified into single-walled carbon nanotubes (SWCNTs) and multi-walled carbon nanotubes according to the number of couplings constituting the wall, and these carbon nanotubes may be appropriately selected according to the uses of dispersions.

In addition, the carbon nanotubes may have a secondary shape formed by aggregating or arranging a plurality of carbon nanotubes. For example, it may be a bundle type carbon nanotube in the form of a bundle or a rope in which a plurality of carbon nanotubes is arranged or aligned side by side in a certain direction, or an entangled type carbon nanotube in the form of a sphere or a potato in which a plurality of carbon nanotubes is entangled without a certain directionality. In terms of dispersibility, it is preferable that the carbon nanotubes are bundle type carbon nanotubes.

The BET specific surface area of the carbon nanotube may be 100 m$^2$/g to 1000 m$^2$/g, 150 m$^2$/g to 800 m$^2$/g, 150 m$^2$/g to 500 m$^2$/g, 150 m$^2$/g to 300 m$^2$/g, or 150 m$^2$/g to 200 m$^2$/g.

When the conductive material is carbon nanotubes, the conductive material may be included in an amount of 1.5 wt % or less in the solid content of the positive electrode slurry composition, specifically 0.5 wt % to 1.0 wt %, more specifically may be included in an amount of 0.6 wt % to 1.0 wt %. When the content of the conductive material in the solid content of the positive electrode slurry composition satisfies the above range, the electrical conductivity of the positive electrode may be improved by retaining the positive electrode conductive network.

A dispersant suppresses excessive aggregation of lithium iron phosphate in the positive electrode slurry composition, and enables lithium iron phosphate to be effectively dispersed and present in the prepared positive electrode active material layer.

The dispersant may include a hydrogenated nitrile-based copolymer, and specifically, the dispersant may be a hydrogenated nitrile-based copolymer.

Specifically, the hydrogenated nitrile-based copolymer is a copolymer including an α, β-unsaturated nitrile-derived structural unit and a hydrogenated conjugated diene-derived structural unit, or a copolymer including an α, β-unsaturated nitrile-derived structural unit, a conjugated diene-derived structural unit, and a hydrogenated conjugated diene-derived structural unit. As the α, β-unsaturated nitrile monomer, for example, acrylonitrile or methacrylonitrile, and the like may be used, and one or a mixture of two or more of these monomers may be used. As the conjugated diene-based monomer, for example, conjugated diene-based monomers having 4 to 6 carbon atoms such as 1,3-butadiene, isoprene, or 2,3-methyl butadiene, and the like may be used, and one or a mixture of two or more of these monomers may be used.

More specifically, the hydrogenated nitrile-based copolymer may be a hydrogenated nitrile-based butadiene rubber (H-NBR).

The weight average molecular weight of the dispersant may be 10,000 g/mol to 150,000 g/mol, preferably 15,000 g/mol to 140,000 g/mol, and more preferably 20,000 g/mol to 130,000 g/mol. This corresponds to a value smaller than the weight average molecular weight of the dispersant included in a conventional positive electrode slurry composition.

When the weight average molecular weight of the dispersant is less than 10,000 g/mol, there is a problem in that the dispersibility of lithium iron phosphate is reduced and the dispersant is eluted during the electrode preparation. When the weight average molecular weight of the dispersant exceeds 150,000 g/mol, the positive electrode slurry composition has a high viscosity, which may decrease stability and coating processability of the positive electrode slurry composition, and the conductive material is aggregated in a linear form, so it is undesirable in terms of the resistance of the lithium secondary battery.

The dispersant may be included in an amount of 1.5 wt % or less, specifically 1.2 wt % or less, and more specifically, 0.1 wt % to 1.0 wt % in the solid content of the positive electrode slurry composition. When the content of the dispersant satisfies the above range, the aggregation of the conductive material in the solid content of the positive electrode slurry composition may be suppressed, thereby improving the positive electrode conductive network.

Meanwhile, in the method for manufacturing a positive electrode according to some embodiments of the present invention, the process of applying the positive electrode slurry composition to the positive electrode current collector may be performed by a method commonly known in the art, for example, it may be uniformly dispersed using a doctor blade or the like, or may be performed through a method such as die casting, comma coating, screen printing, etc.

Meanwhile, in the manufacturing method of the positive electrode according to some embodiments of the present invention, the drying process of the positive electrode slurry composition applied on the positive electrode current collector may be performed according to a commonly known method, for example, it may be performed through heat treatment methods such as a vacuum heating at a constant temperature range, or a hot air injection, etc.

Here, the temperature range of the drying process may be 60° C. to 130° C., specifically 80° C. to 130° C., more specifically 100° C. to 130° C. At this time, when the temperature satisfies the above range, the moisture content within lithium iron phosphate can be minimized, and volatile components included in the process may be sufficiently removed, so that side reactions caused by these components and battery characteristics degradation during charging and discharging of the battery can be prevented.

The time required for the drying process may be 5 minutes to 3 hours, specifically 5 minutes to 20 minutes, and more specifically 5 minutes to 10 minutes.

Through the drying process, the positive electrode slurry composition applied on the positive electrode current collector is dried, thereby forming a positive electrode active material layer.

(2) Forming a Positive Electrode Active Material Layer by N-Times Multi-Rolling

The method for manufacturing a positive electrode for a lithium secondary battery according to some embodiments of the present invention includes a rolling step of forming a positive electrode active material layer by rolling the positive electrode active material layer formed by drying the positive electrode slurry composition N times (N is an integer of 2 or more) in a plurality of stages. In this case, the first rolling process performed for the first time may be a process of pre-rolling the dried positive electrode slurry composition so that the rolling process after the first rolling is easily performed.

The first rolling process may be performed by a roll press method, but is not limited thereto. For example, the first rolling process may be performed in a hot press method.

Before performing the first rolling process, the porosity of the dried positive electrode slurry composition may be 55% or less, specifically 35% to 55%, and more specifically 40% to 55%. When the porosity of the dried positive electrode slurry composition satisfies the above range, it is preferable in that the rolling process of the positive electrode slurry composition becomes easy.

The first rolling process may be performed until the rate of change in thickness of the positive electrode active material layer exceeds a specific numerical value. For example, before/after the first rolling process, the rate of change in thickness of the positive electrode active material layer according to Equation 1 below may be 5% to 15%, specifically 8% to 15%, and more specifically 10% to 15%.

$$\text{Rate of change in thickness (\%)} = \{\text{thickness of } (K-1) \text{ times rolled positive electrode active material layer} - \text{thickness of } K \text{ times rolled positive electrode active material layer}\} \times 100/\text{thickness of positive electrode active material layer before rolling step.} \quad [\text{Equation 1}]$$

In Equation 1, K is an integer greater than or equal to 1 and smaller than or equal to N.

During the first rolling process, when the rate of change in thickness of the positive electrode active material layer satisfies the above range, the positive electrode slurry composition is sufficiently rolled to an extent that the positive electrode active material layer is not separated, thereby minimizing the number of rolling in the subsequent rolling processes.

When the rate of change in thickness of the positive electrode active material layer is within the above range, thereby completing the first rolling process, subsequent rolling processes may be performed.

In the rolling process performed after the first rolling process, the method for manufacturing a positive electrode for a lithium secondary battery according to some embodiments of the present invention may perform rolling so that the rate of change in thickness of the positive electrode active material layer according to Equation 1 above becomes 3.5% or less. Here, the rate of change in thickness may be 0.1% to 3.5%, more specifically 0.5% to 3.5%.

The rolling process after the first rolling process may be performed by a roll press method, but is not limited thereto. For example, the second rolling process may be performed by a hot press method.

In the rolling process after the first rolling, when the rate of change in thickness of the positive electrode active material layer according to Equation 1 exceeds 3.5%, a part of the preliminary positive electrode active material layer where the strength is low (e.g., a part having a thickness smaller than the average thickness or an edge part) breaks, causing the positive electrode active material layer to be separated from the positive electrode current collector.

The rate of change in thickness (%) described above corresponds to the rate of change in the rolling rate (% p). Here, the rolling rate (%) is calculated as in Equation 2 below, and the rate of change in the rolling rate (% p) may be calculated as in Equation 5 below.

$$\text{Rolling rate (\%)} = \qquad \text{[Equation 2]}$$
$$\{(\text{thickness of the positive electrode active material layer}$$
$$\text{before rolling} - \text{thickness of the positive electrode active}$$
$$\text{material layer after rolling } K \text{ times})/\text{thickness of the}$$
$$\text{positive electrode active material layer before rolling}\} \times 100$$

$$\text{Rate of changed in rolling rate (\%}p) = \qquad \text{[Equation 5]}$$
$$\{\text{rolling rate of positive electrode active material}$$
$$\text{layer rolled } K \text{ times} - \text{rolling rate of positive}$$
$$\text{electrode active material layer rolled}(K - 1) \text{ times}\}$$

Accordingly, in terms of the manufacturing method of the positive electrode according to some embodiments of the present invention, in the rolling process after the first rolling, the rate of change in the rolling rate may be 3.5% p or less, specifically 0.1% p to 3.5% p, more specifically 0.5% p to 3.5% p.

In the rolling process, the total number of rolling performed may be 6 times or less, specifically 3 to 6 times, more specifically 4 to 6 times.

If the total number of rolling exceeds 6 times, the thickness of the positive electrode active material layer becomes too thin, and as a result, the part of the preliminary positive electrode active material layer where the strength is low (e.g., a part having a thickness smaller than the average thickness or an edge part) breaks, causing the positive electrode active material layer to be separated from the positive electrode current collector.

After the rolling step, the thickness of the positive electrode active material layer may be 85 μm to 95 μm, specifically 85 μm to 92 μm, and more specifically 85 μm to 91 μm. When the thickness of the positive electrode active material layer after the rolling step satisfies the above range, it is possible to manufacture a high-density positive electrode while preventing separation of the positive electrode active material layer.

After the rolling step, the porosity of the positive electrode active material layer may be 28% to 36%, specifically 28.5% to 36%, more specifically 29% to 36%. Here, after the rolling step means after completing all the rolling processes consisting of a plurality of times, and the porosity may be calculated as in Equation 3 below.

$$\text{Porosity} = \qquad \text{[Equation 3]}$$
$$\{1 - (\text{density of the positive electrode active material}$$
$$\text{layer after rolling } K \text{ times/density of an ideal}$$
$$\text{positive electrode active material layer})\} \times 100$$

Here, "density of an ideal positive electrode active material layer" is the density of a virtual positive electrode active material layer filled with a positive electrode active material, a conductive material, a binder, etc. without an empty space in a positive electrode in which lithium iron phosphate as the positive electrode active material is 95% to 100%. And, the porosity may vary depending on the mixing ratio between the positive electrode active material, the conductive material, the binder, etc., but is known to have a value within the range of 3.3 g/cc to 3.5 g/cc.

The porosity of the positive electrode active material layer after the rolling step is related to the thickness of the positive electrode active material layer after the rolling step. Therefore, when the porosity of the positive electrode active material layer satisfies the above range after the rolling step, a high-density positive electrode can be manufactured while preventing separation of the positive electrode active material layer.

After the rolling step, the rolling rate of the positive electrode active material layer may be 20% to 26%, specifically 22% to 26%, more specifically 23% to 26%. When the rolling rate of the positive electrode active material layer satisfies the above range after the rolling step, a high-density positive electrode may be manufactured while preventing separation of the positive electrode active material layer.

Hereinafter, the present invention will be described in more detail by the Examples. However, the following Examples are for illustrative purposes only and the scope of the present invention is not limited thereto.

Example 1: Preparation of Positive Electrode

Preparation of Positive Electrode Slurry Composition

A positive electrode slurry composition was prepared by adding LiFePO$_4$ positive electrode active material having an average particle diameter D$_{50}$ of 2.4 μm, carbon nanotube (CNT) conductive material, polyvinylidene fluoride (PVdF) binder, and hydrogenated nitrile-based butadiene rubber (H-NBR) dispersant to a N-methylpyrrolidone (NMP) solvent and stirring them. Within the positive electrode slurry composition, the positive electrode active material, the conductive material, the binder, and the dispersant were present in a weight ratio of 97.4:0.8:1.0:0.8, and the solid content of the positive electrode slurry composition was 63 wt %.

Preparation of Positive Electrode

After applying the positive electrode slurry composition on a 20 μm-thick aluminum thin film current collector so that the discharge specific capacity of the final prepared positive electrode is 156.7 mAh/cm², it was vacuum dried at 130° C. for 10 hours.

Then a rolling step was performed on the dried positive electrode active material layer having an initial thickness of 115 μm. Specifically, the dried positive electrode active material layer was rolled by a roll press method, and the rolling process was performed a total of 6 times.

During the first rolling, the positive electrode active material layer was rolled so that its rate of change in thickness is 10.4%, and in the subsequent rolling processes, it was rolled so that the rate of change in thickness of the positive electrode active material layer is 3.5%, 2.6%, 1.8%, 17%, 3.5%, respectively, and prepared a positive electrode.

Here, after each rolling process, the porosity of the positive electrode active material layer was calculated by substituting 3.39 g/cc for the "density of an ideal positive electrode active material layer" of Equation 3 below, and the results were shown in Table 1.

Porosity = [Equation 3]

$\{1 - ($density of the positive electrode active material layer after rolling $K$ times/density of an ideal positive electrode active material layer$)\} \times 100$ Comparative Example 1: Preparation of Positive Electrode In the rolling step, a positive electrode was prepared in the same manner as in Example 1, except that the positive electrode active material layer was rolled once in total, so that the rate of change in thickness of the positive electrode active material layer during rolling was 22.6%.

Comparative Example 2: Preparation of Positive Electrode

In the rolling step, a positive electrode was prepared in the same manner as in Example 1, except that the positive electrode active material layer was rolled a total of 4 times, so that the rate of change in thickness of the positive electrode active material layer during rolling after the first rolling was 3.5%, 5.2%, 3.5%, respectively.

Comparative Example 3: Preparation of Positive Electrode

A positive electrode was prepared in the same manner as in Example 1, except that a total of 7 rolling processes were performed on the positive electrode active material layer having an initial thickness of 122 μm, so that the rate of change in thickness of the positive electrode active material layer during the first rolling was 13.9%, and so that the rate of change in thickness of the positive electrode active material layer during rolling after the first rolling was 3.3%, 2.5%, 1.6%, 2.5%, 0.8%, 1.6%, respectively.

Comparative Example 4: Preparation of Positive Electrode

A positive electrode was prepared in the same manner as in Example 1, except that the positive electrode active material layer was rolled twice in the rolling step so that its rate of change in thickness during the first rolling was 10.4%, and so that its rate of change in thickness during subsequent rolling was 12.1%.

TABLE 1

| | Example 1 | | | | Comparative Example 1 | | | |
| --- | --- | --- | --- | --- | --- | --- | --- | --- |
| Condition | Thickness of positive electrode active material layer (μm) | Porosity (%) | Rolling Rate (%) | Rate of change in thickness (%) | Thickness of positive electrode active material layer (μm) | Porosity (%) | Rolling Rate (%) | Rate of change in thickness (%) |
| Before rolling | 115 | 50 | 0 | — | 115 | 50 | 0 | — |
| Rolling once | 103 | 44 | 10.4 | 10.4 | 89 | 35 | 22.6 | 22.6 |
| Rolling twice | 99 | 42 | 13.9 | 3.5 | | | | |
| Rolling 3 times | 96 | 40 | 16.5 | 2.6 | | | | |
| Rolling 4 times | 94 | 38.5 | 18.3 | 1.8 | | | | |
| Rolling 5 times | 92 | 37.5 | 20.0 | 1.7 | | | | |
| Rolling 6 times | 88 | 34.5 | 23.5 | 3.5 | | | | |

TABLE 1-continued

| | Comparative Example 2 | | | | Comparative Example 3 | | | |
|---|---|---|---|---|---|---|---|---|
| Condition | Thickness of positive electrode active material layer (μm) | Porosity (%) | Rolling Rate (%) | Rate of change in thickness (%) | Thickness of positive electrode active material layer (μm) | Porosity (%) | Rolling Rate (%) | Rate of change in thickness (%) |
| Before rolling | 115 | 50 | 0 | — | 122 | 54 | 0 | — |
| Rolling once | 103 | 44 | 10.4 | 10.4 | 105 | 46 | 13.9 | 13.9 |
| Rolling twice | 99 | 42 | 13.9 | 3.5 | 101 | 44 | 17.2 | 3.3 |
| Rolling 3 times | 93 | 38 | 19.1 | 5.2 | 98 | 42 | 19.7 | 2.5 |
| Rolling 4 times | 89 | 35 | 22.6 | 3.5 | 96 | 41 | 21.3 | 1.6 |
| Rolling 5 times | | | | | 93 | 39 | 23.8 | 2.5 |
| Rolling 6 times | | | | | 92 | 38 | 24.6 | 0.8 |
| Rolling 7 times | | | | | 90 | 37 | 26.2 | 1.6 |

| | Comparative Example 4 | | | |
|---|---|---|---|---|
| Condition | Thickness of positive electrode active material layer (μm) | Porosity (%) | Rolling Rate (%) | Rate of change in thickness (%) |
| Before rolling | 115 | 50 | 0 | — |
| Rolling once | 103 | 44 | 10.4 | 10.4 |
| Rolling twice | 89 | 35 | 22.6 | 12.1 |

Experimental Example 1—Visually Confirming Whether the Positive Electrode Active Material Layer is Separated The positive electrode prepared in Example 1 and Comparative Examples 1 to 4, respectively, were visually observed to determine whether the positive electrode active material layer was separated.

Specifically, by visually observing the positive electrode prepared in Example 1 and Comparative Examples 1 to 4, respectively, whether the rolled positive electrode active material layer was separated from the positive electrode current collector was visually confirmed, and was shown in Table 2 below.

O: Separation of the positive electrode active material layer occurred

X: Separation of the positive electrode active material layer did not occur

In addition, the positive electrodes prepared in Example 1 and Comparative Examples 1 to 3 were illustrated in FIG. 1 to FIG. 4. Specifically, FIG. 1 is a photograph of a positive electrode prepared in Example 1, FIG. 2 is a photograph of a positive electrode prepared in Comparative Example 1, FIG. 3 is a photograph of a positive electrode prepared in Comparative Example 2, and FIG. 4 is a photograph of a positive electrode prepared in Comparative Example 3.

TABLE 2

| | Whether separation of positive electrode active material layer occurred |
|---|---|
| Example 1 | X |
| Comparative Example 1 | O |
| Comparative Example 2 | O |
| Comparative Example 3 | O |
| Comparative Example 4 | O |

Through Table 2 and FIG. 1 and FIG. 2, it can be confirmed that in the positive electrode of Comparative Example 1, which performed rolling only once, separation of the positive electrode active material layer occurred, unlike the positive electrode of Example 1.

In addition, through Table 2 and FIG. 1 and FIG. 3, it can be confirmed that in the positive electrode of Comparative Example 2 and Comparative Example 4, which performed rolling so that the rate of change in thickness during rolling after the first rolling exceeded 3.5%, separation of the positive electrode active material layer occurred, unlike the positive electrode of Example 1.

In addition, through Table 2 and FIG. 1 and FIG. 4, it can be confirmed that in the positive electrode of Comparative Example 3, in which the number of rolling exceeded 5 times, even when rolling was performed at a rate of change of thickness of 3.5% or less during rolling after the first rolling, separation of the positive electrode active material layer occurred, unlike the positive electrode of Example 1.

The invention claimed is:

1. A method for manufacturing a positive electrode for a lithium secondary battery, comprising:
   (S1) applying a positive electrode slurry composition comprising a lithium iron phosphate and a binder onto a current collector and drying the positive electrode slurry composition to form a positive electrode active material layer; and
   (S2) rolling the positive electrode active material layer N times,
   wherein N is an integer greater than or equal to 2,
   wherein
   the rolling step includes a first rolling and at least one second rolling performed after the first rolling,
   wherein during the first rolling, a rate of change in a thickness of the positive electrode active material layer according to Equation 1 is in a range of 5% to 15%, and
   wherein during the at least one second rolling, the rate of change in the thickness of the positive electrode active material layer according to Equation 1 is in a range of 3.5% or less, $$\text{rate of change in thickness (\%)} = \frac{\{\text{a thickness of } (K-1) \text{ times rolled positive electrode active material layer} - \text{a thickness of } K \text{ times rolled positive electrode active material layer}\} \times 100}{\text{a thickness of positive electrode active material layer before the rolling step}},$$ [Equation 1]

wherein K is an integer greater than or equal to 1 and less than or equal to N.

2. The method of claim 1, wherein the rolling step is performed by a multi-stage rolling, wherein N is in a range of 3 to 6.

3. The method of claim 1, wherein after the rolling step, a porosity of the positive electrode active material layer is in a range of 28% to 36%.

4. The method of claim 1, wherein after the rolling step, the thickness of the positive electrode active material layer is in a range of 85 μm to 95 μm.

5. The method of claim 1, wherein after the rolling step, a rolling rate of the positive electrode active material layer is in a range of 20% to 26%, wherein the rolling rate is represented by Equation 2:

Rolling rate(%)=((thickness of the positive electrode active material layer before rolling−thickness of the positive electrode active material layer after rolling K times)/thickness of the positive electrode active material layer before rolling)×100.

6. The method of claim 1, wherein after the rolling step, a porosity of the positive electrode active material layer is in a range of 55% or less.

7. The method of claim 1, wherein after the first rolling step, a rolling rate of the positive electrode active material layer is in a range of 10% or more, wherein the rolling rate is represented by Equation 2:

Rolling rate(%)=((thickness of the positive electrode active material layer before rolling−thickness of the positive electrode active material layer after rolling K times)/thickness of the positive electrode active material layer before rolling)×100.

8. The method of claim 1, wherein the rolling step is performed by a roll press method.

9. The method of claim 1, wherein the lithium iron phosphate is a compound represented by Formula 1 below:

$$Li_{1+a}Fe_{1-x}M_x(PO_{4-b})X_b$$ [Formula 1]

wherein M includes one or more elements of Al, Mg, Ni, Co, Mn, Ti, Ga, Cu, V, Nb, Zr, Ce, In, Zn, and Y, X includes one or more elements of F, S, and N, and a, b, and x are −0.5≤a≤0.5, 0≤b≤0.1, 0≤x≤0.5, respectively).

10. The method of claim 1, wherein the lithium iron phosphate is LiFePO$_4$ having an olivine crystal structure.

11. The method of claim 1, wherein a solid content of the lithium iron phosphate of the positive electrode slurry composition is in a range of 94.90 wt % to 97.96 wt %.

12. The method of claim 1, wherein a solid content of the binder of the positive electrode slurry composition is included in a range of 0.5 wt % to 3.5 wt %.

13. The method of claim 1, wherein during the at least one second rolling, the rate of change in the thickness of the positive electrode active material layer according to Equation 1 is in a range of 0.1% to 3.5%.

* * * * *